Nov. 14, 1944.                H. H. SCOTT                2,362,503
                       FREQUENCY-MEASURING DEVICE
                Filed Dec. 10, 1941         4 Sheets-Sheet 1

INVENTOR
Hermon Hosmer Scott
BY
ATTORNEY

Nov. 14, 1944.                H. H. SCOTT                2,362,503
                        FREQUENCY-MEASURING DEVICE
                Filed Dec. 10, 1941           4 Sheets—Sheet 2

INVENTOR
Hermon Hosmer Scott
BY
ATTORNEY

Nov. 14, 1944.  H. H. SCOTT  2,362,503

FREQUENCY-MEASURING DEVICE

Filed Dec. 10, 1941  4 Sheets-Sheet 3

Fig. 9

INVENTOR
Hermon Hosmer Scott
BY
ATTORNEY

Fig. 10

Patented Nov. 14, 1944

2,362,503

UNITED STATES PATENT OFFICE 2,362,503

FREQUENCY-MEASURING DEVICE

Hermon Hosmer Scott, Winter Hill, Mass., assignor to General Radio Company, Cambridge, Mass., a corporation of Massachusetts Application December 10, 1941, Serial No. 422,381

22 Claims. (Cl. 172—245)

The present invention relates to systems for measuring the frequency of an alternating current or voltage and, more particularly, to systems for indicating such frequency directly upon an indicating instrument, and in the presence of harmonics or interfering currents or voltages. The invention further relates to square-wave, peaked-wave and saw-tooth-wave generators.

Various devices for measuring frequencies are in use, or have been proposed. The simplest are those of the resonance type, such as electromechanical systems including tuned reeds, or the purely electrical selective-circuit type. Another is the null-circuit type, illustrated by the Wien bridge or the parallel T. Still another may be termed the frequency-response type, because it comprises an electrical circuit having a predetermined frequency-transmission characteristic. With this type of device the frequency of any particular voltage is generally determined through some means, either direct or indirect, of measuring the transmission of the circuit for that frequency. A device of a still further type operates, with the aid of a thyratron or other relay circuit, to convert the alternating voltage or current into a series of pulses, and comprises means for counting these pulses. This may be termed the pulse-counting type.

These prior-art devices are all subject to defects which it is an object of the present invention to overcome. The frequency-response type of circuit, in particular, though it is easily adapted for direct indication on an indicating instrument and has the further advantage of simplicity, has the serious disadvantage that it is affected by waveform and by the amplitude of the input voltage or current. The usual pulse-counting type of circuit attempts to overcome these disadvantages, but the circuit complications, as well as the usual difficulties encountered in the use of thyratron tubes, limit its practicability.

A chief object of this invention is to provide a simple, inexpensive and satisfactory means for measuring frequency that shall be substantially independent of the amplitude and/or the waveform of the voltage or current to be measured, and that shall be unaffected by interfering voltages or currents of a lesser amplitude, or by random interference such as static discharges, etc.

Another object of this invention is to provide a novel circuit that shall yield an output current or voltage that shall be proportional to, or that shall vary with, or inversely with, the frequency of the input voltage or current, but that shall be substantially unaffected by the waveform or the amplitude of said input voltage or current, and by ordinary amounts of interference.

A further important object of this invention is to provide, with the use of suitable auxiliary equipment, an improved frequency monitor for use with radio-transmitting stations, and for other purposes.

Another object of the invention is to provide a novel square-wave generator.

A further object of the invention is to provide a novel saw-tooth-wave generator.

A further object of the invention is to provide a novel peaked-wave generator.

A further object of the invention is to provide means for equalizing the positive and the negative portions of the waveform in a square-wave, peaked-wave or saw-tooth-wave generator.

Other and further objects will be explained hereinafter and will be particularly pointed out in the appended claims.

The invention will now be explained in connection with the accompanying drawings, in which.

Throughout this specification, the term "distorting" is used to denote the modifying or translating of any type of waveform into a continuous recurrent waveform of predetermined waveshape with reference to the time axis. The resulting waveform, therefore, retains only one characteristic of the original—namely, the fundamental frequency—except, of course, in those special cases where the original waveform may already be of the type desired. The words "distorting" and "translating" may, therefore, be considered interchangeable in this specification. The translated waveform may be termed "uniform in time duration," meaning that, when plotted with the appropriate time axis, it has the same shape, regardless of frequency.

Figure 1:
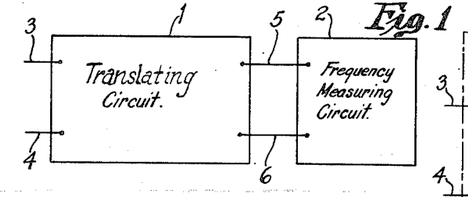
Fig. 1 is a diagrammatic, simplified view of circuits and apparatus illustrating the fundamental functioning of a circuit embodying the present invention.

The alternating voltage the frequency of which is to be measured may be assumed to be applied to the terminals 3 and 4 of the input circuit of a distorting or translating circuit, diagrammatically illustrated at 1. The output circuit of this distorting or translating circuit 1 may be connected by connecting leads 5 and 6 to a frequency-indicating or frequency-measuring circuit 2. Regarded in its broadest form, the invention may be practised with the aid of a suitable combination of these two circuits 1 and 2.

The frequency-measuring circuit 2 may comprise any of the types before mentioned. It may, for example, for purposes of simplicity, be of the frequency-response type. One disadvantage to which this type of circuit, as at present employed, is subject, namely, that it is affected by the waveform and the amplitude of the input voltage, may be overcome, according to the present invention, by employing a distorting or translating circuit 1 that shall provide essentially the same output voltage and waveform under all conditions, irrespective of the nature of the input voltage and waveform, provided only that the input voltage is of a reasonable amplitude and within the frequency range of the equipment. The only characteristic of the output waveform which shall vary in accordance with the input waveform is the frequency. The frequency-responsive circuit 2, therefore, is not necessarily unresponsive to changes in voltage or waveform when used in accordance with this invention.

Figures 2A, 2B, 2C:
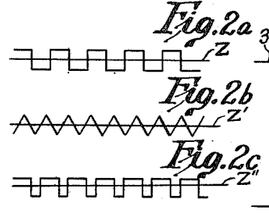
Figs. 2a, 2b and 2c are representations of some of the voltage or current waveforms involved in the normal functioning of such circuit, plotted against time, Fig. 2a illustrating a symmetrical square waveform, Fig. 2b a saw-tooth waveform, and Fig. 2c a non-symmetrical square waveform.

Although it is not necessary that the distorting or translating circuit 1 provide an output voltage of any particular waveform, the square type of waveform, as typically illustrated in Figs. 2a and 2c, is, under many conditions, the most desirable for the purpose. This type of waveform can be easily obtained by any of several well-known methods, as, for instance, by means of overloaded amplifiers, non-linear clipper or limiter circuits, etc.

Figure 3:
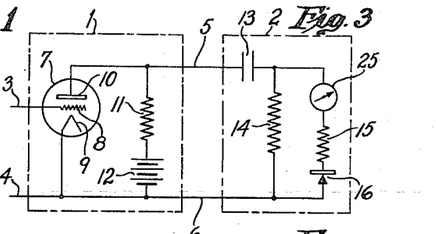
Fig. 3 is a more detailed diagram similar to Fig. 1, illustrating the invention in one of its simplest forms, and embodying an overloaded-amplifier distorting or overloaded-amplifier-translating circuit.

A more or less conventional overloaded-amplifier distorting or translating circuit 1 is illustrated in Fig. 3 as comprising a vacuum tube 7, provided with a cathode 9, a grid or control electrode 8 and an anode 10. The input terminals 3 and 4 are shown respectively connected to the grid 8 and the cathode 9. For this circuit to operate satisfactorily in a manner commonly referred to as overloaded, the input voltage applied to the terminals 3 and 4 should be substantially larger than that required to obtain linear amplification. The current flowing in the plate or output circuit of the saturable-amplifier tube 7 will then have a square waveform similar to Fig. 2a or 2c. The amplifier 1 may comprise a suitable plate-loading circuit, shown as a resistor 11. The leads 5 and 6 couple the output circuit of the amplifier to the frequency-measuring or frequency-indicating circuit 2. The frequency-measuring circuit is illustrated in Fig. 3 as comprising a condenser 13, a resistor 14, and a rectifier-voltmeter circuit comprising a rectifier 16, a resistor 15, and an indicating instrument 25, connected together in series, with the series circuit in parallel with the resistor 14. If the rectifier 16 is of the vacuum-tube type, the network comprising these elements may constitute a vacuum-tube voltmeter for indicating the output of the said network.

The alternating-current output path of the amplifier 7 may be traced from the plate or anode 10, by way of the lead 5, through the condenser 13 and the resistor 14, and by way of the lead 6, to the cathode 9. Though the coupling resistor 11 may also conduct an appreciable alternating current, this is unimportant, and would not occur if the resistor 11 were replaced by a coupling inductor. The resistor 11 could also be replaced by the primary winding of a transformer, the secondary winding of which would be connected directly to the leads 5 and 6.

The alternating current flowing through the condenser 13 and the resistor 14 sets up a voltage drop across the condenser 13 that varies the current actually flowing in the circuit as a function of frequency. The alternating voltage across the resistor 14 will accordingly vary as the frequency is varied.

The direct-current component of the amplifier tube 7 flows only through the plate-coupling circuit, which may be traced essentially from the anode 10, through the resistor 11 and the battery 12, to the cathode 9.

The sizes of condenser 13 and resistor 14 should be selected so that the response of the indicating circuit shall vary with the frequency of the applied waveform. The readings of the indicating-meter instrument 25 will then depend upon the frequency of the voltage applied to the terminals 3 and 4, but they will be substantially independent of the voltage or the waveform, so long as said voltage is high enough to operate the amplifying tube 7 in the aforementioned overloaded manner. Since the overloaded amplifier, in effect, converts the original voltage waveform into a square waveform, furthermore, the effects of interfering waveforms or static will be of a relatively minor nature.

The condenser 13, it will be observed, performs two functions in this particular form of the circuit. As is the case with any condenser, it first blocks out of the meter-indicating circuit any direct-current components which may exist in the output circuit of the distorting or translating circuit 1. Secondly, it supplies the proper reactance in the frequency-measuring circuit 2, having a predetermined frequency-transmission characteristic, for providing that the voltage applied to this meter-indicating circuit shall vary with the frequency. At the high end of the frequency range, the reactance of this condenser 13 is low, and at the low end of the frequency range it is high. So long as the reactance of condenser 13 is high compared to the resistance of resistor 14, these elements comprise one of the many circuit combinations which are frequently considered as performing the electrical equivalent of differentiation.

If desired, of course, two separate condensers 13 may be employed, one for performing the blocking function and the other for providing the necessary reactance so that the output voltage shall be a function of the input frequency, as before described. Where the condenser 13 is relied upon for blocking purposes only, it should be relatively large. A coupling transformer may be used in place of the blocking condenser. The direct current which operates the meter is not the same direct current which flows through the plate circuit of the vacuum tube 7.

Figure 4:
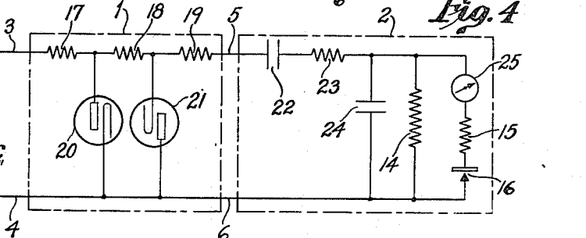
Fig. 4 is a similar view of a modification, in which the overloaded amplifier of the distorting or translating circuit of Fig. 3 is shown replaced by a non-linear type of clipper circuit.

The action which takes place in circuits such as the circuit of Fig. 4 is similar, excepting that the limiting or translating action is obtained by diodes or other rectifiers rather than by a saturated amplifier, in a manner commonly used in square-wave generators. In this particular circuit, since two diodes are used in opposite phase, one provides the return direct-current path for the other. Hence the direct-current component flows through the circuit consisting of the rectifiers 21 and 20 and the resistor 18. Some direct current might also flow through the leads 3 and 4, depending upon what was connected to the input. If only a single diode were used, or if the diodes were all in one phase, it would, of course, be necessary to provide some return path for the direct current.

As an illustration of another of the many possible frequency-measuring circuits, the circuit 2 of Fig. 4 comprises a shunt condenser 24 and a series resistor 23. By proportioning condenser 24 so that its impedance is small with respect to resistor 23 at the high end of a predetermined frequency range and large at the low end, a circuit is obtained which has a response varying approximately inversely with frequency over said predetermined range. Under such conditions, the condenser 22 functions mainly as a blocking condenser and should have a comparatively large capacitance. The combination of the resistor 23 and the condenser 24 performs in a manner analogous to integration so long as the resistance of the resistor 23 is large compared to the impedance of the condenser 24. Assuming that the wave-form applied between the leads 5 and 6 is similar to Fig. 2a, the waveform appearing across the condenser 24 will then be similar to Fig. 2b and will vary in amplitude inversely with the frequency.

Figure 8:
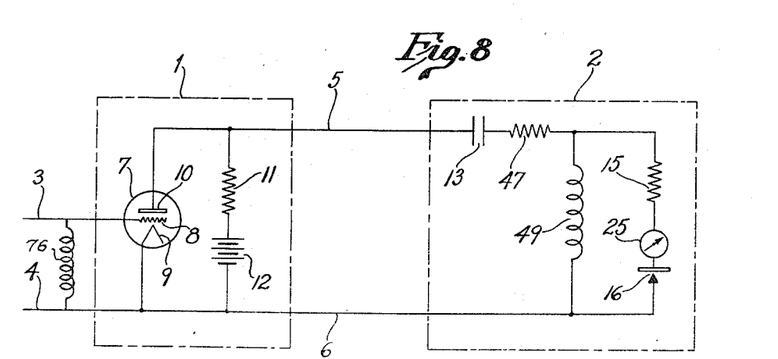
Fig. 8 is a diagram similar to Fig. 3, illustrating the use of inductance in the frequency-meter circuit.

In some cases, however, the additional necessary reactance may be required to be inductive rather than capacitive, as illustrated by 49 in Fig. 8. In such cases, the condenser 13 may be large or small, depending upon the type of response desired. Where it is desired to vary the frequency range over which the meter is to operate, moreover, it may become necessary to vary one or more of the circuit elements of the network. Thus, an additional condenser or coil may be connected in parallel or series with the condenser 13 or other frequency-controlled elements, as by means of a switch. A similar result can be obtained by using variable circuit elements, as, for instance, 13 in Fig. 5.

A non-linear-clipper-circuit type of distorting circuit is illustrated in Fig. 4. The non-linear type of clipper or limiter circuit is shown as comprising two diodes or other rectifiers 20 and 21, together with suitable auxiliary circuit elements. The auxiliary circuit elements are in this case shown as comprising series-connected resistors 17, 18 and 19, arranged in ladder form with the diodes 20 and 21. Circuits of this type clip off, or limit, the wave peaks, hence their name. The diodes 20 and 21 serve to clip the peaks off of the alternating voltage which is impressed across the circuit at terminals 3 and 4, before it reaches the terminals 5 and 6. In Fig. 4, for the sake of variety, the frequency-measuring circuit 2 is illustrated as comprising a relatively large condenser 22 in place of the condenser 13 of Fig. 3, and also the resistor 23, and the condenser 24.

The direct-current path may be traced from the terminal 3, through the resistors 17 and 18, and the diode 21, to the terminal 4; or, alternatively, from the terminal 3, through the resistor 17, and the diode 20, to the terminal 4; or, alternatively, through diodes 20 and 21 and resistor 18.

The alternating-current paths through the diodes 20 and 21 are the same as the direct-current paths, with the addition that the alternating current will flow also through the frequency-measuring circuit comprising the resistor 19, the condenser 22, the resistor 23 and the condenser 24.

In all cases, the alternating current from the translating circuit flows into and actuates the frequency-measuring circuit, while no direct current from the distorting circuit need necessarily flow through the frequency-measuring circuit. The frequency-measuring circuit is essentially only a frequency-measuring device, and does not require direct current from the translating circuit for its actuation.

The operation of the frequency-measuring circuit of Fig. 4 is the inverse of that illustrated in Fig. 3. In the meter of Fig. 3, the current through the indicating instrument 25 will increase with the frequency of the applied voltage. The arrangement shown in Fig. 4, however, will provide a decrease in the indicating-instrument current when the frequency is increased. The circuit elements 23 and 24 of Fig. 4 constitute what is frequently referred to as an integrating circuit which, in effect, converts a square waveform, such as illustrated in Fig. 2a, into a sawtooth waveform, such as shown in Fig. 2b.

The circuit elements 13 and 14 of Fig. 3 may similarly be considered as a differentiating circuit. The same is true with respect to the corresponding circuit elements in other circuits, such as are illustrated in Figs. 5, 6, 7 and 9. This is because the current through the condenser 13 depends upon the rate of change of the voltage across it. This current is thus a derivative of the voltage applied between the leads 5 and 6, and the voltage across the resistor 14 is proportional to this current. The impedance of the capacitance 13 will vary appreciably over a predetermined frequency range, thus varying the current through the resistor 14, the impedance of which is small compared to that of the capacitance 13.

In general, a differentiating circuit may consist of a series capacitor 13, and a shunt resistor 14, as, for instance, in Fig. 3; or a series resistor 47 and a shunt inductor 49, as, for instance, in Fig. 8, where the capacitor 13 is relatively large, so that it acts only as a blocking condenser.

Similarly, inversion of the circuit provides an integrating action, as with a series resistor 23 and shunt capacitor 24, in Fig. 4, where the capacitor 22 is large, so as to provide direct-current blocking action only. If the resistor 23 were changed to an inductor, and the capacitor 24 to a resistor, a similar integrating action would also be obtained. Fig. 2b shows the effect of integrating the waveform shown in Fig. 2a. The integrating type of circuit, that is, one with a falling frequency transmission characteristic, is somewhat less affected by an unsymmetrical square wave than the differentiating circuit. Either type may, however, be so set up that the effects are minimized, for certain frequency ranges, but for wide frequency ranges further compensation is necessary where maximum accuracy is required.

In actual practice, the usual square-wave generator tends to produce a waveform such as shown in Fig. 2c rather than the symmetrical type of square wave, a shown in Fig. 2a. Though Figs. 2a and 2c both represent square waveforms, the lengths of the positive and negative pulses are shown equal in Fig. 2a, but unequal in Fig. 2c. It is desirable to use a frequency-measuring circuit which is not appreciably affected by such inequality and/or to provide a distorting or translating circuit which tends to produce only the waveform as shown in Fig. 2a. This latter condition may be obtained, to some degree, by using amplifiers in the distorting or translating circuit, and controlling their bias automatically by rectifiers which may or may not be associated with the frequency-measuring circuits. Such a condition is particularly desirable when it is necessary that the frequency measuring system cover a wide range of frequencies.

Figure 5:
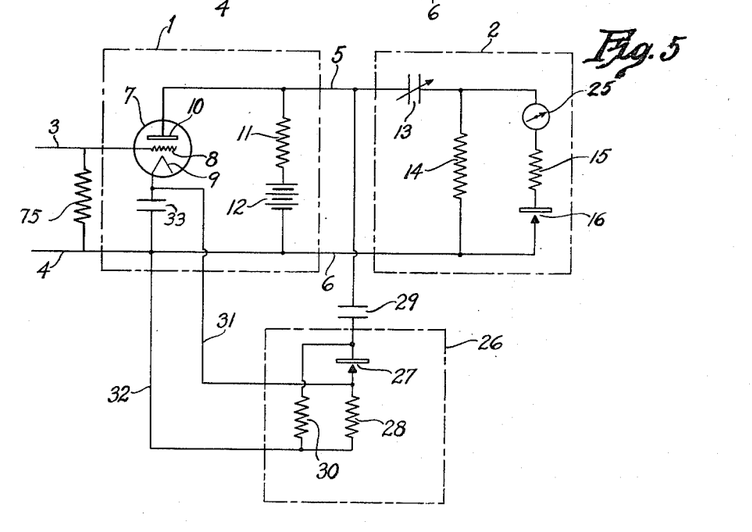
Fig. 5 is a similar view of a circuit diagram according to which the non-symmetrical square waveform illustrated in Fig. 2a may be utilized.

Such an arrangement is shown in Fig. 5. The cathode 9 is connected to the lead 6 through a condenser 33. The auxiliary circuit, designated as 26, and shown consisting essentially of a diode or other rectifier 27 and resistors 28 and 30, provides, by means of conductors 31 and 32, a variable bias in the cathode circuit of the vacuum tube 7. This bias is provided by the voltage across the resistor 28. One of the ends of each of the resistors 28 and 30 is connected by the conductor 32 to the lead 6. The other end of the resistor 30 is connected to one terminal of the condenser 29. The other end of the resistor 28 is connected to one electrode of the diode 27, the other electrode of which is connected to the said terminal of the condenser 29. The other terminal of the condenser 29 is connected to the lead 5. The conductor 31 is connected between the cathode 9 and the condenser 33, on the one hand, and between the resistor 28 and the diode 27 on the other.

If the square wave, as produced by the distorting or translating circuit 1, should tend to be non-symmetrical, as illustrated in Fig. 2c, the circuit 26 would exert a corrective action through varying the bias on the vacuum-tube amplifier 7, and would hence tend to make the waveform more nearly a symmetrical square wave, as illustrated in Fig. 2a. This amplifier is not necessarily limited to a single vacuum tube.

A square wave may be considered as consisting of a continuous series of positive and negative pulses, or peaks, or half-cycles, which terms are used interchangeably. In a symmetrical waveform the positive and negative peaks have the same shape. In the symmetrical square waveform shown in Fig. 2a, the positive and negative half-cycles are equal in both amplitude and time duration. The line $z$, parallel to the time axis, represents the average of this waveform, or the zero-voltage line of the waveform if no direct component is present. The zero line of Fig. 2b is shown at $z'$. When a circuit does not transmit direct current, the zero line corresponds to the actual algebraic average of the waveform. Naturally the zero line may be shifted by adding a direct-current component to the waveform.

In the unsymmetrical square waveform shown by Fig. 2c, the corresponding zero-line $z''$ is, by definition, so placed that the relative length of the positive peaks with respect to the negative is balanced by the relative amplitude of the negative pulses with respect to the positive, the area under which each being the same.

The various circuits 1 may all be made to generate symmetrical square waves, as shown in Fig. 2a, with the application of a particular waveform to the input terminals 3 and 4. If the input waveform is varied, however, the circuits, to various degrees, may tend to produce an unsymmetrical waveform, as shown in Fig. 2c. This will affect the operation of the frequency-measuring circuits. It is consequently desirable that the translating or distorting circuits 1 shall produce, so far as possible, symmetrical square waves such as shown in Fig. 2a, rather than unsymmetrical waves shown in Fig. 2c. Hence the application of certain means for producing an automatic correction of the waveform.

Figure 10:
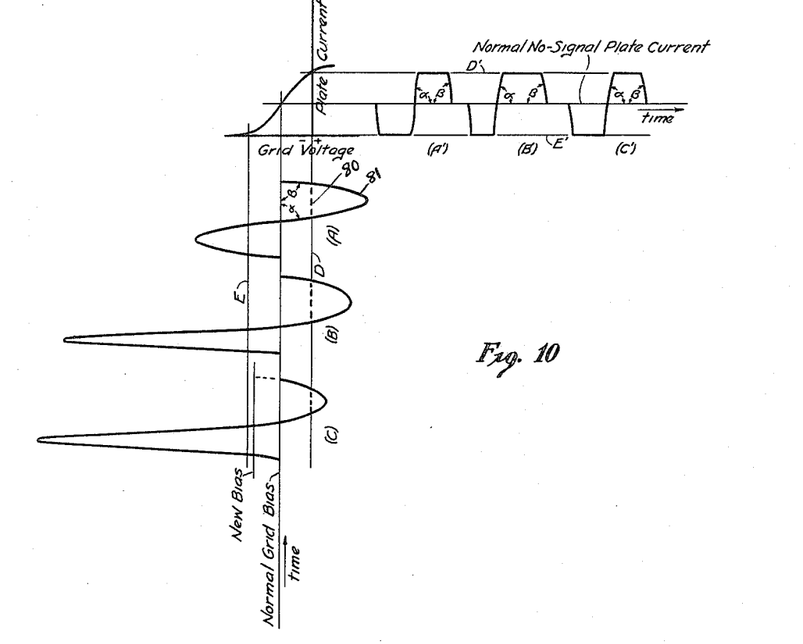
Fig. 10 is a diagram showing in conventional manner the relation between grid voltage and plate current in an ordinary type of vacuum-tube amplifier, for conditions of distortionless and overloaded operation, and illustrating the action of the automatic equalizer circuits.

The manner in which the automatic-equalizer devices cause the positive and negative halves of the translated alternating-current waveforms to possess substantially equal time durations will be explained in connection with Fig. 10 showing, in conventional manner, the results of the application of three different types of waveform (A), (B) and (C) to the vacuum-tube amplifier and the resulting generation of square waves (A'), (B') and (C') in accordance with this invention. It will be noted that there are two limits to the grid-voltage-plate-current amplifier characteristic beyond which excursions of the plate current are impossible. One of these is set by the actual cut-off of the plate current when the grid is driven sufficiently negative. This is the zero-plate-current line shown as E' and corresponds to some definite grid voltage shown as E. At the other extreme, assuming that the grid is driven from a circuit having substantial impedance or resistance when the grid is driven positive or, in the case of some special tubes, beyond some other predetermined point, the grid will draw current, which means that the impedance of the grid circuit drops to a relatively low value.

If a sine waveform (A) is applied to the grid circuit from a source of substantial impedance, the effect will be to clip the positive peak from the waveform at a point generally corresponding to zero grid voltage, so that the actual waveform will follow the broken line 80, rather than the solid line 81. The limit D is thus obtained, which corresponds generally to the zero-grid voltage point on the tube, as well as the corresponding plate-current limit D'.

In this connection it should be observed that, if the alternating voltage applied to the grid is supplied from a source of sufficiently low impedance so that this type of limiting does not take place, another type of limiting will occur due to the flattening off of the grid-voltage-plate-current characteristic in the high-current region, or due to limitations in the power supply providing the plate current to the tube. This would provide a similar type of limiting or clipping action, although at a somewhat different value of current. The limits E' and D' would be attained.

In the average type of amplifier, for distortionless amplification, therefore, the voltage applied to the grid should not vary beyond the limits D and E, and the resulting plate current will stay within the limits D' and E'. Fig. 10 shows also the normal grid bias and the resulting no-signal plate current which might be used for this type of amplification.

In accordance with this invention, however, square waves are generated through the clipping action of an overloaded amplifier. In the simplest case, assume that the sine wave (A) is applied to the amplifier grid circuit from a source of substantial impedance. As a result of the clipping action described, the plate current will not exceed the maximum and minimum limits, respectively, D' and E', and the output waveform hence will be as shown in (A'). As the amplitude of the wave (A) is increased, the angles $\alpha$ and $\beta$ at which the waveform crosses the zero line will obviously approach 90°, and the curve (A') will approach a true symmetrical square wave.

Practically any symmetrical input waveform could be substituted for the sine-wave curve (A) with the same results. A symmetrical waveform comprises odd harmonics only, and the limitation of any frequency-measuring device to this type of waveform only would, of course, be a serious disadvantage.

The waveform (B) is a typical unsymmetrical waveform, including even harmonics. When applied to the amplifier with a normal bias, the output current will resemble the curve (B'). As the amplitude of the input voltage is increased, the curve (B') will approach a square wave, but it is obviously nonsymmetrical. If however, the normal grid bias of the amplifier is shifted to the point marked "New bias," which, in effect, adds a direct-voltage component to the input waveform, the waveform will be shifted as shown by the curve (C). It is thus possible to vary the relative amounts of the waveform which are above and below the zero line, thus adjusting the relative durations of these parts of the wave-form. When this resulting waveform is applied to the amplifier, the output current is represented by the curve (C'), which is similar to the curve (A'), and which will approach a true symmetrical square wave as the amplitude of the curve (C) is increased. For a resistive load, the output voltage will have the same waveform as the current, but the phase will be reversed.

This correcting action, which is obtained by shifting the normal amplifier bias, may be obtained automatically, as by means of the circuit shown in Fig. 5. Let it be assumed that the circuit constants in Fig. 5 are so adjusted that, when the wave form (A) is applied to the input terminals 3 and 4, the plate current will have the waveform (A). The plate voltage across the leads 5 and 6 will then have this same waveform, but opposite in phase. It should be noted that the bias between the grid and the cathode of the tube 7 is determined by the current through the resistor 28, which produces a voltage across the condenser 33.

If, now, a waveform such as that shown at (B) is applied to this circuit, the voltage across the leads 5 and 6 would have the general shape (B'), with the phase reversed. This waveform is transmitted through the condenser 29 to the automatic bias circuit 26. The condenser 29 does not transmit the direct component of the voltage across the leads 5 and 6. With an unsymmetrical square waveform, therefore, an increase in the time duration of the negative peaks with respect to that of the positive peaks will produce a resulting increase in the amplitude of the positive peaks with respect to the zero line, at the expense of the negative peaks. The zero line of the automatic circuits may be shifted by varying a direct-current bias in series with the applied waveform.

It will be noted that the normal plate current of the vacuum tube 7 flows through the resistor 28, thus producing a voltage drop which, being smoothed by the condenser 33, provides a bias between the grid and the cathode of the tube. In this respect, the circuit functions similarly to many circuits designed for linear amplification. It will also be noted that the average plate current of the tube 7, when transmitting a waveform such as illustrated at (B'), will tend to rise, thus increasing the grid bias automatically. This will shift the grid potential in a negative direction, providing a certain degree of automatic compensation, and tending to provide operation as shown by the waveform (C') rather than by the waveform (B'). There will also flow through the resistor 28, as a result of the rectifier 27 and its connection through condenser 29 to lead 5, which is connected to the plate circuit of the vacuum tube 7, a component of current derived from the rectification of the output voltage of this vacuum tube. The circuit components are so chosen that, under conditions whereby a symmetrical waveform, such as the wave form (A), is applied to the input circuit the grid bias which appears across the resistor 28 and the condenser 33 is also partly supplied by the voltage drop due to these rectified current components. An increase in the amplitude of the positive halves of a square wave at the expense of the negative halves, therefore, will increase the total current flowing through the resistor 28, and thus further increase the bias, thus tending to produce the type of operation shown by the waveform (C'), rather than that shown by the waveform (B').

In Fig. 5, the saturating action of the vacuum tube maintains the output voltage across the leads 5 and 6 at an approximately constant amplitude. The rectifying circuit 26 rectifies the positive halves only of this waveform. The other circuit elements, including the resistors 28 and 30, are so adjusted that, for a normal symmetrical square waveform, when the positive peaks will always occupy the same proportion of the total wavelength—namely, one-half—the bias will consequently remain constant at its normal optimum value. Condenser 29 eliminates any direct component from the voltage applied to the circuit 26. However, if, for instance, the positive peaks should be longer than the negative peaks, and consequently occupy a greater portion of the wavelength and have a lower amplitude with respect to the zero axis, the average current through rectifier 27 would decrease, and also the bias on the vacuum tube. This change in bias would, in effect, shift the total voltage applied to the grid of the tube 7 in a positive direction. The amplifier thus cuts off more of the tops of the positive peaks, making them longer, and cuts off less of the negative peaks, making them shorter. The action of the vacuum tube, however, reverses this by 180°, so that the net result is a reduction in the length of the positive peaks of the alternating-voltage waveform across the leads 5 and 6.

The output waveform is thus corrected to approach the waveform of Fig. 2a rather than that of Fig. 2c by adjusting the bias on the input of the amplifier 7 automatically by means of the voltage obtained at the output. The greater the gain of the amplifier, the greater the improvement that can be obtained in this respect.

The circuit of Fig. 5 is only one of many possible arrangements whereby deviation in the output waveform of a square-wave generator or translator from symmetry may be corrected by automatic means to tend to produce a symmetrical square wave. A similar corrective action can be obtained in non-linear clipper circuits, such as those shown in Figs. 4 and 9, by applying a variable bias to the diodes in the same manner as the variable cathode circuit bias is applied in Fig. 5. Such arrangements can, of course, be expanded to include control on both the positive and negative peaks, and to exert control on any desired number of amplifying stages or other forms of distorting or translating circuits.

The corrective action obtained with diodes or other rectifiers is similar to that obtained when the grid circuit of a vacuum-tube amplifier is driven positive. The rectifier 20 in Fig. 4, for instance, presents a substantially low impedance to voltages of one polarity and a high impedance to voltages of the opposite polarity. A certain amount of natural bias is present in most rectifiers as an inherent characteristic resulting from contact potential, electronic emission, etc. By inserting an additional bias in series with the rectifier, however, an effect can be secured similar to the grid-limiting action as shown in Fig. 10 in connection with the limit line D.

The automatic bias circuit 26 of Fig. 5 may, for instance, be used equally well to introduce a bias in series with the rectifier 20 or the rectifier 21 in Fig. 4. The resistor 28 and the condenser 33 in parallel could be inserted directly in series with one of these rectifiers, so that the bias across the resistor 28 would be in series with any alternating voltage applied to the rectifier, thus providing an automatic correction effect, as previously explained in connection with the description of grid-limiting action, as shown in Fig. 10 in connection with the limit line D. A single rectifier, of course, provides limiting on only one peak, so that two or more rectifiers are necessary if both peaks of the wave are to be clipped.

These are reasonably satisfactory arrangements, so long as the input waveform is such that it crosses the zero line at more or less equally spaced intervals. Many alternating voltages or currents, however, do not have this characteristic, and under such circumstances it is more difficult to provide a circuit which will provide a completely symmetrical square output waveform.

Figure 6:
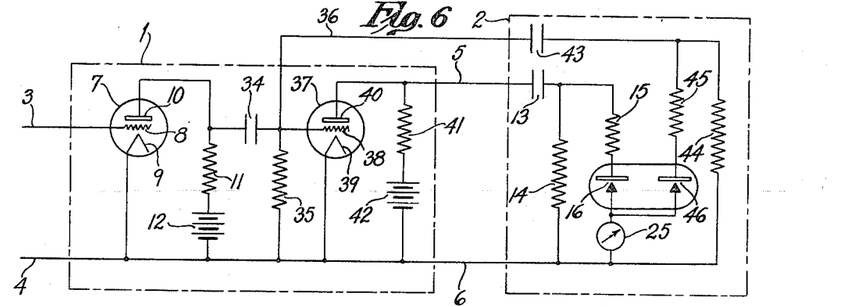
Fig. 6 is a similar diagram of a circuit for providing accurate frequency measurements notwithstanding that the square waveform generated is nonsymmetrical, as illustrated in Fig. 2c.

Errors from this cause can, however, be further minimized by a circuit such as that shown in Fig. 6. In Fig. 6, the distorting or translating circuit 1 is shown expanded so as to have two output circuits for providing output voltages that are respectively opposite in phase, but that are otherwise similar. As shown, this may be accomplished by coupling a phase-inverter stage to the amplifier stage 7. The phase-inverter stage comprises a vacuum tube 37 having a cathode 39, a control electrode 38 and an anode 40. The input circuit of the tube 37, comprising the cathode 39 and the control electrode 38, is connected to the output circuit of the vacuum tube 7 by a coupling blocking condenser 34 and a coupling impedance 35. The output circuit of the tube 37, comprising the cathode 39 and the anode 40, is supplied with energy by a battery 42, corresponding to the battery 12, and an impedance 41, corresponding to the impedance 11. The output voltages from the two amplifier and phase-inverter stages will thus differ by substantially 180 degrees. Obviously, the same results may be obtained by means of a transformer, or by any other of the many possible expedients for obtaining a phase reversal.

In Fig. 6, the frequency-measuring circuit 2 is also shown expanded, so as to include two separate frequency-responsive rectifier network circuits respectively connected to the said two output circuits of the distorting or translating circuit 1. The phase inverter 37 is shown connected to one of these network circuits comprising the condenser 13 and the resistor 14. The amplifier 7 is shown connected to the other by a corresponding condenser 43 and a corresponding resistor 45. The conductor 36 corresponds to the conductor 5 and the impedance 44 to the impedance 14. These two frequency-measuring circuits operate respectively on voltages opposite in phase, but with the output circuits of both their voltmeter circuits connected so as to feed the same indicating instrument 25. Any deviation of the measured waveform from a symmetrical square wave, therefore, will tend to increase the current through one of the rectifier circuits and, at the same time, to decrease the current through the other rectifier circuit. Since the actual current which operates the indicating instrument 25 is the sum of these two currents, the effects of lack of symmetry in the waveform are, therefore, substantially cancelled or rendered negligible.

Figure 7:
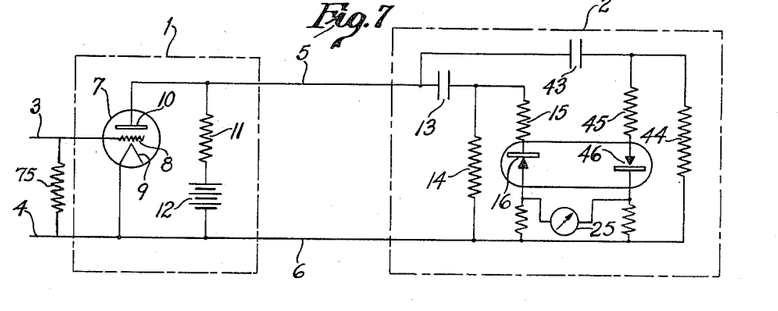
Fig. 7 is a similar diagram of a modified circuit operating substantially as does the circuit of Fig. 6.

A similar effect may be achieved somewhat more simply by the circuit shown in Fig. 7. According to this circuit, as with the circuit of Fig. 6, it is possible to provide accurate frequency measurement in spite of the non-symmetrical waveform, rather than to provide such a completely symmetrical waveform, as with the system of Fig. 5. As in Fig. 3, the distorting or translating circuit 1 is provided with only a single output circuit, but correction for a non-symmetrical square wave is obtained through the use of a full-wave rectifier circuit. In this case, of course, the two rectifiers will be connected in opposite directions instead of, as in Fig. 6, in the same direction.

Fig. 8 differs from the other circuits shown in that the frequency-measuring circuit 2 comprises an inductance. Such circuits can also be of the full-wave or double type, as shown in Figs. 7, 9 and 6.

A resistor 75 is shown connected across the input leads 3 and 4 of Fig. 5, since the bias across the resistor 28 is varied. The resistor is not absolutely essential in all the other circuits; unless the terminals 3 and 4 are connected to a series condenser in the output circuit, it is, however, illustrated in Fig. 7 also. The resistor 75 may be replaced by an inductor 76, as shown in Fig. 8, or by any other impedance that will permit transmission of the grid bias.

Figure 9:
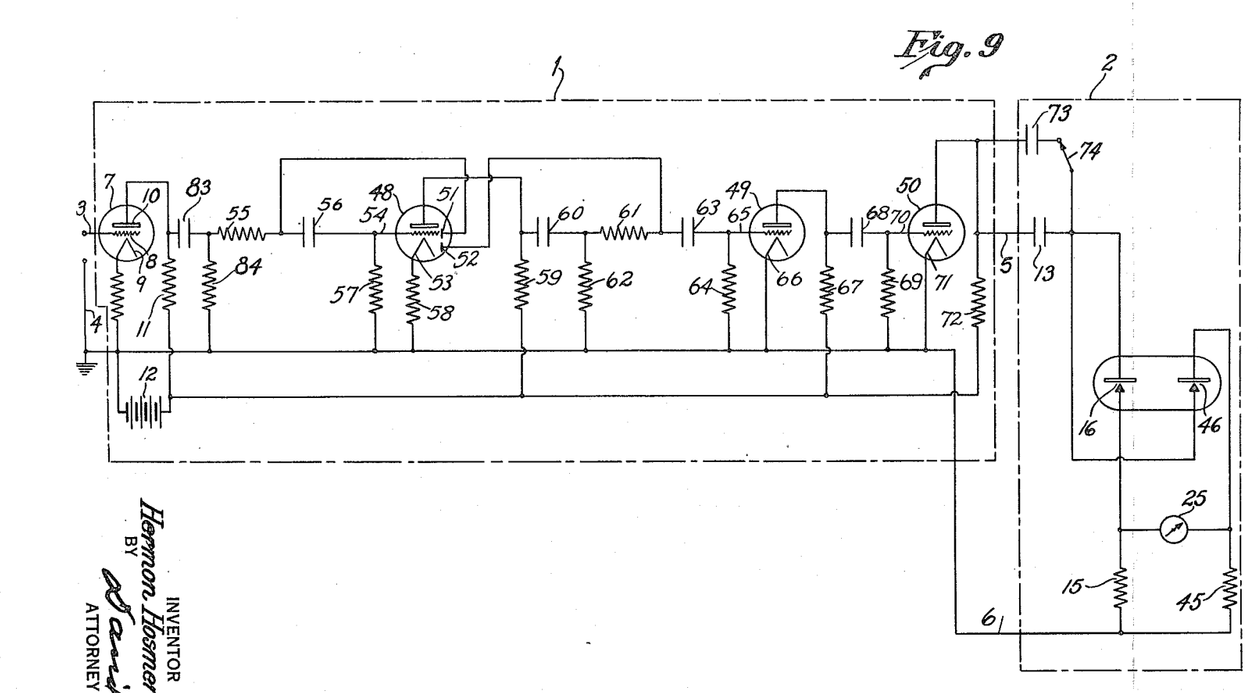
Fig. 9 is a similar circuit diagram, illustrating the invention in a preferred form.

Fig. 9 shows a preferred form of the invention involving a more elaborate distorting or translating circuit and a still different type of full-wave frequency indicator. The tube 7 is shown connected to the remainder of the circuit by a condenser 83 and a resistor 84. The distorting or translating circuit consists essentially of the amplifying tubes designated as 7, 48, 49 and 50, all or any of which may or may not be operated in a so-called overloaded condition, and the clipper circuits involving the diode plates 51 and 52. In the diagram these diodes are included in one of the other tubes, namely, 48, and utilize in common with the other elements of the tube the cathode 53. This is merely a particular arrangement made practical by the tube types commercially available, but equal results could be obtained if the plates 51 and 52 were disposed in separate diodes of the vacuum-tube or other type, or if they comprised a so-called double diode, that is, two diodes in one envelope. It will be noted that the diode 51 is connected in the circuit ahead of the amplifying stage utilizing the triode portion of tube 48, while the diode having plate 52 is connected after said amplifying stage, thus providing 180° phase difference and clipping both sides of the waveform. When the input voltage applied to terminals 3 and 4 is relatively small substantially all of the clipping is accomplished by these diode circuits. If this voltage is increased, the amplifying stages involving tubes 48 and 7 will overload, producing additional clipping action. Additional clipping may or may not take place in vacuum tubes 49 and 50. The normal current through the diode 52—53 in Fig. 9 provides a type of automatic correction somewhat similar to that in Fig. 5. In this circuit the diode limiters are 51—53 and 52—53, and the diode 52—53 functions not only as the limiter, but also as an automatic correction rectifier, corresponding to the rectifier 27 in Fig. 5. With diode 52—53 the resistors 58, 62 and 61 are also associated, and the capacitance 60 appears in series with resistor 59 and battery 12 across resistor 62.

Hence a direct-current component will be added to the voltage across the resistor 62 as a result of this capacitance. The diode 52—53 will clip the positive peaks of the alternating voltage appearing across it through the well known unidirectional-conduction characteristic of rectifiers. As previously pointed out in connection with the correction circuit 26, the positive peaks of a symmetrical square wave, when rectified, will produce a substantially constant average current which, in Fig. 9, flows through the diode 52—53 and the resistors 58, 62, and 61. This current will be in the form of square pulses, but the capacitance across the resistor 62 will be charged by these pulses, thus introducing a direct component into the current and reducing the higher-frequency components. In this case, the average current flowing in the rectifier and associated resistors, and consequently the direct-current bias, will increase if the positive peaks are higher than for a symmetrical waveform. An increase in the relative amplitude, or a shortening of the relative time duration of the positive peaks, thus shifts the grid bias of the vacuum-tube amplifier 48 in a negative direction, thus changing the clipped waveform from that as shown by the broken line in the waveform (B') in Fig. 10 to that of the waveform (C') in Fig. 10.

In connection with Fig. 9, it will be noted that diode 51—53 would theoretically perform in a manner opposite to the correcting function of diode 52—53. However, this effect is relatively slight, since the diode 51—53 precedes triode 48 in the circuit, and hence does not benefit from the amplification of this triode. However, if the diode plate 51 were located in the tube 7, the resulting diode 51—9 would function in the same manner as the diode 52—53, thus providing further automatic correction of waveform. The dependence of these various biases upon the alternating currents produces an automatic action depending upon signal level and waveform, thus tending to produce square waveforms as in Fig. 2a, rather than the unsymmetrical type shown in Fig. 2c. These diodes thus may perform, in addition to clipping, an automatic correcting effect of a nature similar to that obtained through the more elaborate circuit arrangement in Fig. 5.

So sensitive a method of controlling the waveform is not shown in Fig. 9, since such a system is not necessary with the full-wave type of diode voltmeter circuit shown therein. The automatic correction action shown in Fig. 9 involves only what may conveniently be incorporated in the circuit without adding any appreciable number of elements, since the full-wave type of rectifier at the output is in itself considerably less affected by a non-symmetrical square waveform than the half-wave type of rectifier shown in the frequency meters of Figs. 3, 4 and 5.

The frequency-indicating circuit 2 of Fig. 9 comprises the condensers 13 and 73 operating in conjunction with a full-wave voltmeter comprising rectifiers 16 and 46, resistors 15 and 45, and meter 25. Condenser 73 is shown as connected in series with a switch 74, so that it may or may not be in the circuit, depending upon the frequency range desired. This is a further simplification over Fig. 7, since in Fig. 9 the condenser 43 is not required to obtain satisfactory operation. Condenser 73 performs a different function and is added to extend the range of the frequency meter. In the same manner, further condensers may be added, or one or more of them may be made variable, like the condenser 13 in Fig. 5.

In actual practice, any one of a large number of combinations of distorting or translating circuit and frequency-indicating device may be combined. For instance, the non-linear rectifier-type clipper circuits shown as 1 in Figs. 4 and 9 may be substituted directly for the overloaded type of distorting or translating circuits shown as 1 in Figs. 3, 6, 7 and 8, and also in Fig. 5 by using the auxiliary circuit 26 to control a bias on one of the diodes. Similarly, the overloaded type of distorting or translating circuit shown in Figs. 3, 5, 6, 7 and 8 can be used in place of the distorting or translating circuits shown in Figs. 4 and 9, and the automatically corrected distorting or translating circuit shown in Fig. 5 and comprising the circuits designated by 1, 29 and 26 may be substituted directly in any of the other circuits shown.

An important application of this invention is for the purpose of monitoring the frequency of radio-transmitting stations. For this purpose the frequency meter is combined with a radio-frequency oscillator, or other standard of frequency. The output of said oscillator or frequency standard or a harmonic thereof is heterodyned against the signal of the radio transmitter or a harmonic thereof and the resulting beat note measured by the frequency meter.

Further modifications and changes will also occur to persons skilled in the art, and all such are considered to fall within the spirit and scope of the present invention, as defined in the appended claims.

What is claimed is:

1. A meter for measuring the frequency of an alternating voltage within predetermined frequency and voltage limits having, in combination, a rectifying limiter having an input circuit and an output circuit for producing in the output circuit a substantially constant alternating voltage of substantially uniform waveform in time duration for any alternating voltage and waveform applied to the input circuit within the said frequency and voltage limits, means for applying to the input circuit an alternating frequency and voltage within the said limits, a frequency-measuring circuit, and means for connecting the frequency-measuring circuit to the output circuit.

2. A meter for measuring the frequency of an alternating voltage within predetermined frequency and voltage limits having, in combination, square-wave-generating means having an input circuit and an output circuit for producing in the output circuit a substantially constant alternating voltage of substantially uniform waveform in time duration for any alternating voltage and waveform applied to the input circuit within the said frequency and voltage limits, means for applying to the input circuit an alternating frequency and voltage within the said limits, a frequency-measuring circuit, and means for connecting the frequency-measuring circuit to the output circuit.

3. An electric system for converting the waveforms of a source of alternating voltage into square waveforms having in combination, a vacuum-tube amplifier having an input circuit and an output circuit, means for biasing the input circuit, means for impressing upon the input circuit from the source a voltage larger than that required for linear amplification in order to overload the amplifier, whereby a wave will appear in the output circuit distorted with respect to the wave impressed upon the input circuit from the source into square form, and means for varying the bias of the input circuit in accordance with variations in the waveform impressed from the source upon the input circuit, thereby to improve the symmetry of the square waveform in the output circuit.

4. An electric system having, in combination, translating means having an input circuit and an output circuit for producing in the output circuit a substantially constant alternating voltage of substantially uniform waveform in time duration for any alternating voltage and waveform applied to the input circuit within predetermined frequency and voltage limits, means for applying to the input circuit an alternating frequency and voltage within the said limits, a frequency-responsive circuit comprising a full-wave vacuum-tube voltmeter, and means for connecting the frequency-responsive circuit to the output circuit.

5. An electric system for converting the waveforms of a source of alternating voltage into square waveforms having, in combination, a non-linear clipper circuit having an input circuit and an output circuit, means for biasing the clipper circuit, means for impressing upon the input circuit from the source of voltage larger than that required for distortionless transmission, whereby a wave will appear in the output circuit distorted with respect to the wave impressed upon the input circuit from the source into square form, and means for varying the bias of the clipper circuit in accordance with variations in the waveform impressed from the source upon the input circuit, thereby to improve the symmetry of the square waveform in the output circuit.

6. A meter for measuring the frequency of an alternating voltage within predetermined limits of frequency, waveform and voltage having, in combination, square-wave-generating means having an input circuit and an output circuit for producing in the output circuit a substantially symmetrical square wave having positive and negative half cycles of equal time duration, means for applying to the input circuit an alternating voltage of frequency, waveform and voltage within the said limits, means controlled by variations from symmetry of the resulting square wave for varying a direct-voltage bias in series with the input voltage, thus tending to maintain such symmetry in the output voltage, a frequency-measuring circuit, and means for connecting the frequency-measuring circuit to the output circuit.

7. A meter for measuring the frequency of an alternating voltage within predetermined limits of frequency, waveform and voltage having, in combination, a square-wave-generating amplifier having an input circuit and an output circuit for producing in the output circuit a substantially symmetrical square wave having substantially equal positive and negative half-cycles and of a substantially constant voltage for any waveform applied to the input circuit within said frequency, waveform and voltage limits, means for applying to the input circuit an alternating frequency and voltage within said limits, means for biasing said amplifier, means controlled by variations from symmetry of the square wave for varying said bias so as to tend to maintain such symmetry in the output waveform, a frequency-measuring circuit, and means for connecting the frequency-measuring circuit to the output circuit.

8. A meter for measuring the frequency of an alternating voltage within predetermined limits of frequency, voltage and waveform having, in combination, translating means comprising a multiple-stage overloaded amplifier having an input circuit and an output circuit for producing in the output circuit a substantially symmetrical square waveform having substantially equal positive and negative half-cycles for any alternating voltage applied to the input circuit within said limits of frequency, waveform and voltage, means for applying to the input circuit an alternating voltage within said limits, a frequency-measuring circuit, and means for connecting the frequency-measuring circuit to the output circuit.

9. A meter for measuring the frequency of an alternating voltage within predetermined limits of frequency, waveform and voltage having, in combination, a rectifying limiter having an input circuit and an output circuit for producing in the output circuit a constant alternating voltage of substantially symmetrical square waveform and having substantially equal positive and negative half-cycles for any alternating voltage within said limits of frequency, waveform and voltage applied to the input circuit, means for applying to the input circuit an alternating voltage within said limits, a frequency-measuring circuit, and means for connecting the frequency-measuring circuit to the output circuit.

10. A meter for measuring the frequency of an alternating voltage within predetermined limits of frequency, waveform and voltage having, in combination, square-wave generating means having an input circuit and an output circuit for producing in the output circuit a substantially constant alternating voltage of substantially symmetrical square waveform, means for applying to the input circuit an alternating voltage within said limits, a frequency-measuring circuit, and means for connecting said frequency-measuring circuit to the output circuit.

11. An electric system for converting the waveform of a source of alternating voltage into a symmetrical square waveform having, in combination, a vacuum-tube amplifier having an input circuit and an output circuit means for biasing the input circuit, means for impressing upon the input circuit from the source a voltage larger than that required for linear amplification in order to overload the amplifier, whereby a square waveform will appear in the output circuit distorted with respect to the wave impressed upon the input circuit from the source, having the frequency of the wave impressed upon the input circuit, and means for varying the bias of the input circuit in accordance with variations in the square waveform from symmetry to improve the symmetry of the square waveform in the output circuit.

12. An electric system having, in combination, translating means having an input circuit and an output circuit for producing in the output circuit a substantially constant alternating voltage of square waveform for any alternating voltage applied to the input circuit within predetermined limits of frequency, waveform and voltage, means for applying to the input circuit an alternating voltage within said limits, a frequency-responsive circuit comprising a full-wave vacuum-tube voltmeter, and means for connecting the frequency-responsive circuit to the output circuit.

13. An electric system for converting the waveform of a source of alternating voltage into a substantially symmetrical square waveform having, in combination, a nonlinear clipper circuit having an input circuit and an output circuit, means for biasing the clipper circuit, means for impressing upon the input circuit from the source a voltage larger than that required for distortionless transmission whereby a waveform will appear in the output circuit distorted with respect to the waveform impressed upon the input circuit and having a square shape, and means for varying the bias of the clipper circuit in accordance with variations in the square waveform from symmetry, thereby to improve the symmetry of the square waveform in the output circuit.

14. A frequency meter comprising a translating system comprising a series of amplifying vacuum tubes and rectifiers, a frequency-responsive system having an input and an output and a full-wave vacuum-tube voltmeter, means for operating the translating system so that, within a predetermined range of input voltage, waveform and frequency, the output voltage shall be a substantially square waveform, means comprising the rectifiers and the vacuum tubes whereby a direct voltage bias in the circuit is shifted in accordance with any deviation in said output waveform from a symmetrical square wave, thereby to tend to cause said output waveform to be a symmetrical square wave, means for applying the said output waveform to the input of the frequency-responsive system, the frequency-responsive system comprising a reactance and having a predetermined transmission characteristic over said range of frequencies, and means for connecting the output of said frequency-responsive system to the full-wave vacuum-tube voltmeter.

15. A meter for measuring the frequency of an alternating voltage within predetermined frequency and voltage limits having, in combination, square-wave-generating means having an input circuit and an output circuit for producing in the output circuit a substantially constant alternating voltage of substantially uniform square waveform in time duration for any alternating voltage and waveform applied to the input circuit within the said frequency and voltage limits, means for applying to the input circuit an alternating voltage of frequency and voltage within the said limits, means controlled by variations from symmetry of the said substantially uniform square waveform for tending to maintain such symmetry, a frequency-measuring circuit, and means for connecting the frequency-measuring circuit to the output circuit.

16. A meter for measuring the frequency of an alternating voltage within predetermined frequency and voltage limits having, in combination, a square-wave-generating amplifier having an input circuit and an output circuit for producing in the output circuit a substantially constant alternating voltage of substantially uniform square waveform in time duration for any alternating voltage and waveform applied to the input circuit within the said frequency and voltage limits, means for applying to the input circuit an alternating voltage of frequency and voltage within the said limits, means for biasing the amplifier, means controlled by variations from symmetry of the said substantially uniform square waveform for varying the bias so as to tend to maintain such symmetry, a frequency-measuring circuit, and means for connecting the frequency-measuring circuit to the output circuit.

17. A meter for measuring the frequency of an alternating voltage within predetermined frequency and voltage limits having, in combination, multiple-stage overloaded amplifier-translating means having an input circuit and an output circuit for producing in the output circuit a substantially constant alternating voltage of substantially uniform waveform in time duration for any alternating voltage and waveform applied to the input circuit within the said frequency and voltage limits, means for applying to the input circuit an alternating voltage of frequency and voltage within the said limits, a frequency-measuring circuit, and means for connecting the frequency-measuring circuit to the output circuit.

18. A meter having, in combination, generating means having an input circuit and an output circuit for producing in the output circuit a substantially constant alternating voltage of substantially uniform waveform in time duration for any alternating voltage and waveform applied to the input circuit within predetermined frequency and voltage limits, means for applying to the input circuit an alternating voltage of frequency and voltage within the said limits, a network connected to the output circuit and comprising reactance for providing a predetermined frequency-transmission characteristic within the said frequency limits, and a full-wave vacuum-tube voltmeter for measuring the output of the network.

19. A meter having, in combination, generating means having an input circuit and an output circuit for producing in the output circuit a substantially constant alternating voltage of substantially uniform waveform in time duration for any alternating voltage and waveform applied to the input circuit within predetermined frequency and voltage limits, means for applying to the input circut an alternating voltage of frequency and voltage within the said limits, a measuring circuit, and means for connecting the measuring circuit to the output circuit.

20. A meter having, in combination, generating means having an input circuit and an output circuit for producing in the output circuit a substantially constant alternating voltage of substantially uniform waveform in time duration for any alternating voltage, waveform and frequency applied to the input circuit within predetermining voltage, waveform, and frequency limits, means for applying to the input circuit an alternating voltage of voltage, waveform and frequency within the said limits, a network connected to the output circuit and comprising reactance for providing a predetermined frequency-transmission characteristic within the said frequency limits, and a full-wave vacuum-tube voltmeter for measuring the output of the network.

21. A meter for measuring the frequency of an alternating voltage within predetermined frequency and voltage limits having, in combination, square-wave-generating means having an input circuit and an output circuit for producing in the output circuit a substantially constant alternating voltage of substantially uniform square waveform in time duration for any alternating voltage and waveform applied to the input circuit within the said frequency and voltage limits, means for applying to the input circuit an alternating voltage of frequency and voltage within the said limits, means connected to the input circuit and controlled by variations from symmetry of the said substantially uniform square waveform for tending to maintain such symmetry, a frequency-measuring circuit, and means for connecting the frequency-measuring circuit to the output circuit.

22. A meter having, in combination, square-wave-generating means having an input circuit and an output circuit for producing in the output circuit a substantially constant alternating voltage of substantially uniform waveform in time duration for any alternating voltage and waveform applied to the input circuit within predetermined frequency and voltage limits, means for applying to the input circuit an alternating voltage of frequency and voltage within the said limits, means controlled by variations from symmetry of the said substantially uniform square waveform for tending to maintain such symmetry, a measuring circuit, and means for connecting the measuring circuit to the output circuit.

HERMON H. SCOTT.